United States Patent Office 2,839,563
Patented June 17, 1958

2,839,563
PHOSPHITES

Ingenuin Hechenbleikner, Adams, Mass., assignor to Shea Chemical Corporation, Jeffersonville, Ind., a corporation of Tennessee No Drawing. Application December 28, 1955
Serial No. 555,762

6 Claims. (Cl. 260—461)

This invention relates to the production of new organic derivatives of phosphorus and, more particularly, to the production of new cyclic derivatives of trivalent phosphorus.

It is an object of the present invention to provide stable, high-boiling non-discoloring cyclic organic derivatives of trivalent phosphorus.

It is a further object of this invention to produce cyclic derivatives of trivalent phosphorus which possess good stabilizing action for resins.

Another object is the preparation of cyclic derivatives of trivalent phosphorus which are good antioxidants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished by the preparation of cyclic organic phosphites having the formula (a)

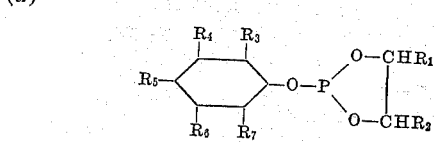

or (b)

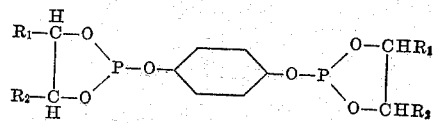

or (c)

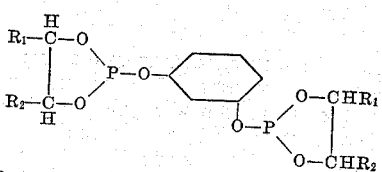

wherein $R_1$ and $R_2$ can be the same or different and are hydrogen or an alkyl group and $R_3$, $R_4$, $R_5$, $R_6$ and $R_7$ are the same or different and are hydrogen, halogen, alkyl, cycloalkyl, nitro, alkoxy, aryloxy and aryl and $R_3$ and $R_4$ are joined to complete a naphthalene ring and $R_4$ and $R_5$ are joined to complete a naphthalene ring. Typical examples of such compounds are ethylene phenyl phosphite; ethylene 2-chlorophenyl phosphite; ethylene 3-chlorophenyl phosphite; ethylene 4-chlorophenyl phosphite; ethylene 2,3-dichlorophenyl phosphite; ethylene 2,4-dichlorophenyl phosphite; ethylene 2,5-dichlorophenyl phosphite; ethylene 2,6-dichlorophenyl phosphite; ethylene 3,4-dichlorophenyl phosphite; ethylene 3,5-dichlorophenyl phosphite, ethylene 2-bromophenyl phosphite; ethylene-3-bromophenyl phosphite; ethylene-4-bromophenyl phosphite; ethylene-2-iodophenyl phosphite; and the corresponding 3 and 4 monoiodophenyl phosphites; ethylene-2-fluorophenyl phosphite (and the corresponding 3 and 4 monofluorophenyl phosphites), ethylene-2-chloro, 4-bromophenyl phosphite; ethylene-2-methyl phenyl phosphite; ethylene-3-methyl phenyl phosphite; ethylene-4-methyl phenyl phosphite; ethylene-3,5 dimethyl phenyl phosphite, ethylene-2-ethylphenyl phosphite; ethylene-4-ethylphenyl phosphite; ethylene-2-hexylphenyl phosphite, ethylene-2-cyclohexylphenyl phosphite, ethylene-4-octylphenyl phosphite, ethylene-3-isobutylphenyl phosphite; ethylene-2-dodecylphenyl phosphite; ethylene-2-methoxyphenyl phosphite; ethylene-3-methoxyphenyl phosphite; ethylene-4-methoxyphenyl phosphite; ethylene-2-ethoxyphenyl phosphite; ethylene-2-octoxyphenyl phosphite; ethylene-2-amylphenyl phosphite; ethylene-2-butylphenyl phosphite; ethylene-2-tertiary butyl phenyl phosphite; ethylene-2-secondary butylphenyl phosphite; ethylene-2-phenoxyphenyl phosphite; ethylene-2-alpha naphthoxyphenyl phosphite; ethylene-2-beta naphthoxyphenyl phosphite; ethylene-2-phenylphenyl phosphite; ethylene alpha naphthyl phosphite; ethylene-2-nitrophenyl phosphite; ethylene-3-nitrophenyl phosphite; ethylene-4-nitrophenyl phosphite; 1-methylethylene phenyl phosphite; 1-methylethylene 2-chlorophenyl phosphite; 1,2-dimethylethylene phenyl phosphite; 1,2-dimethylethylene 3-chlorophenyl phosphite; 1-ethylethylene phenyl phosphite. The above compounds can be made by reacting equimolecular proportions of the appropriate primary aromatic dichloro phosphite with the appropriate glycol having adjacent hydroxyl groups in the presence of two mols of a tertiary base such as pyridine or triethylamine as a hydrogen chloride absorber in accordance with the reaction

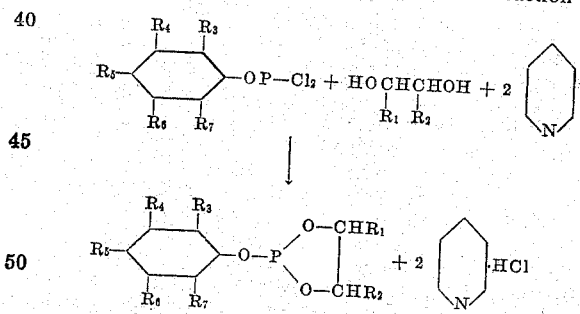

where $R_1$, $R_2$, $R_3$, $R_4$, $R_5$, $R_6$ and $R_7$ have the same definition as that previously stated. In preparing the derivatives of

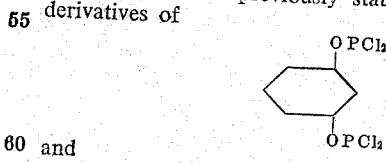

and

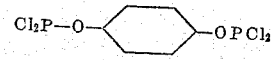

it is necessary to use four mols of the glycol and four mols of the tertiary amine for each mol of the dichloro phenylene diphosphite. Typical examples of dichloro phosphites which can be used as starting materials in the present invention are phenyl dichloro phosphite; 2-chlorophenyl dichloro phosphite; 3-chlorophenyl dichloro phosphite; 4-chlorophenyl dichloro phosphite; 2,3-dichlorophenyl dichloro phosphite; 2,4-dichlorophenyl dichloro phosphite; 2,5-dichlorophenyl dichloro phosphite;

2,6-dichlorophenyl dichloro phosphite; 3,4-dichlorophenyl dichloro phosphite; 3,5-dichlorophenyl dichloro phosphite; 2-bromophenyl dichloro phosphite; 3-bromophenyl dichloro phosphite; 4-bromophenyl dichloro phosphite; 2-iodophenyl dichloro phosphite; 2-fluorophenyl dichloro phosphite; 2-chloro, 4-bromophenyl dichloro phosphite; 2-methylphenyl dichloro phosphite; 3-methylphenyl dichloro phosphite; 4-methylphenyl dichloro phosphite; 3,5-dimethylphenyl dichloro phosphite; 2-ethylphenyl dichloro phosphite; 4-ethylphenyl dichloro phosphite; 2-hexylphenyl dichloro phosphite; 2-cyclohexylphenyl dichloro phosphite; 4-octylphenyl dichloro phosphite; 3-isobutylphenyl dichloro phosphite; 2-dodecyl phenyl dichloro phosphite; 2-methoxyphenyl dichloro phosphite; 3-methoxyphenyl dichloro phosphite; 4-methoxyphenyl dichlorophosphite; 2-ethoxyphenyl dichlorophosphite; 2-octoxyphenyl dichloro phosphite; 2-amylphenyl dichloro phosphite; 2-butylphenyl dichlorophosphite; 2-tertiary butylphenyl dichloro phosphite; 2-secondary butylphenyl dichloro phosphite; 2-phenoxyphenyl dichlorophosphite; 2-alpha naphthoxyphenyl dichloro phosphite; 2-beta naphthoxyphenyl dichloro phosphite; 2-phenylphenyl dichloro phosphite; alpha naphthyl dichloro phosphite; beta naphthyl dichloro phosphite; 2-nitrophenyl dichloro phosphite; 3-nitrophenyl dichloro phosphite; 4-nitrophenyl dichloro phosphite; m-phenylene di(dichloro phosphite) and p-phenylene di(dichloro phosphite). Many of the above primary aromatic dichloro phosphites are old compounds and are shown for example in Kosolopoff's "Organophosphorus Compounds," on pages 199–200. Those which are new can be prepared by reacting the corresponding phenol with phosphorus trichloride in the manner set forth on page 180 of Kosolopoff, using equivalent amounts of the phenol and phosphorus trichloride.

As the glycol reactant there can be employed ethylene glycol; 1,2-propylene glycol; 1,2-butylene glycol; 2,3-butylene glycol, etc.

Instead of reacting one mole of a primary aromatic dichloro phosphite with one mol of a glycol for each phosphorus atom in the dichloro phosphite in the presence of two mols of a tertiary amine for each phosphorus atom in the dichlorophospite, it is also possible to form the new compounds by reacting one mol of the corresponding tertiary aromatic phosphite with one mol of the desired glycol for each phosphorus atom in the phosphite. The reaction is carried out for example by reacting at 65° C. at atmospheric pressure and then separating the desired glycol ester product from the phenol formed by distillation at reduced pressure, e. g. 1 mm. In this alternate procedure it is not necessary to use a tertiary amine. Typical phosphites which can be used in this alternative method are triphenyl phosphite; tri-4-chlorophenyl phosphite; tri-2-methoxyphenyl phosphite; tri-4-nitrophenyl phosphite; tri-2-methylphenyl phosphite; tri-3-methylphenyl phosphite; tri-4-methylphenyl phosphite; tri-4-tertiary butylphenyl phosphite; tri-tertiary octylphenyl phosphite; tri-phenylphenyl phosphite; tri-o-cyclohexyl phenyl phosphite; tri alpha naphthyl phosphite; tri beta naphthyl phosphite; tri-1-(2,4-dibromo)naphthyl phosphite.

It is important in forming the compounds of the present invention that the proportions above referred to be employed as any substantial deviation therefrom results in the formation of other compounds which are not the subject of the present invention. Sometimes the reaction is facilitated by having an inert organic solvent such as ether or benzene present.

The compounds of the present invention are useful as antioxidants for natural rubber and various butadiene synthetic rubbers, as antioxidants for gasoline, as stabilizers for polyvinyl chloride and as plasticizers for vinyl chloride resins and other plastics.

The compounds of the present invention which have two atoms of phosphorus in the molecule and, hence, two heterocyclic rings (the phosphorus and oxygen being the hetero atoms) have been found to be especially preferred for the above-mentioned uses.

*Example 1*

One mol of ethylene glycol was mixed with two mols of pyridine in one liter of diethyl ether at room temperature and there was gradually added over a period of about ½ hour one mol of phenyl dichlorophosphite. When the addition was complete the pyridine hydrochloride formed was filtered off and the solvent stripped off at atmospheric pressure. The residue was distilled at reduced pressure (about 0.5 mm.) and ethylene phenyl phosphite was obtained in a yield of about 85% of the theoretical. The ethylene phenyl phosphite was a colorless liquid and had a B. P. of 75° C. at 0.5 mm., $N_d^{25°}$ 1.53105; $D^{25}$ 1.230.

*Example 2*

Example 1 was repeated using propylene glycol in place of ethylene glycol. The product obtained was propylene phenyl phosphite having the formula

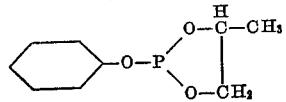

*Example 3*

Example 1 was repeated using 2 mols of ethylene glycol, 4 mols of pyridine and 1 mol of p-phenylene di-(dichloro phosphite). The produce obtained had the formula

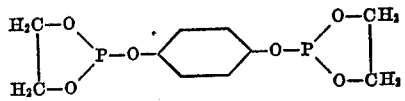

*Example 4*

Example 3 was repeated replacing the p-phenylene di-(dichloro phosphite) with m-phenylene di-(dichloro phosphite) and the product obtained was

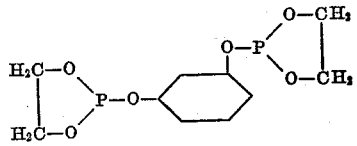

The other compounds of the present invention can be obtained in identical fashion by using the appropriate starting materials as previously set forth.

I claim:
1. Compounds having the formula:

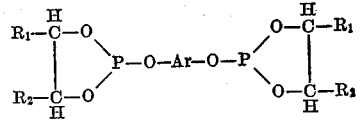

wherein $R_1$ and $R_2$ are selected from the group consisting of hydrogen and a lower alkyl group and Ar is an aromatic radical selected from the group consisting of benzene and naphthalene hydrocarbon radicals and having its two free valences on the ring directly attached to the oxygen atoms and such hydrocarbon radicals substituted by a lower alkyl group.

2. Compounds having the formula:

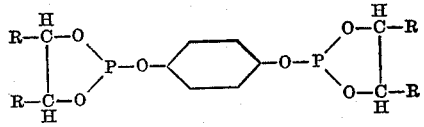

wherein at least one R is a lower alkyl group and any R which is not an alkyl group is hydrogen.

3.

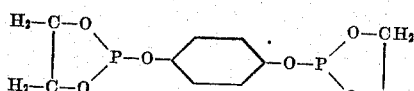

4. Compounds having the formula:

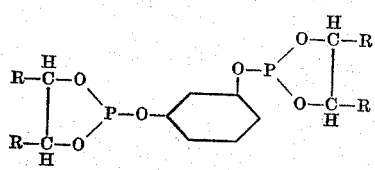

wherein at least one R is a lower alkyl group and any R which is not an alkyl group is hydrogen.

5.

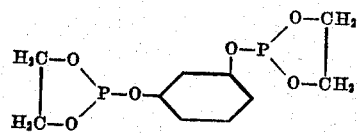

6. A process of preparing the compounds of claim 1 comprising reacting two mols of a glycol having the formula:

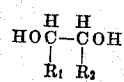

with one mol of a phosphite having the formula $(ArO)_3P$ wherein $R_1$, $R_2$ and Ar are defined as in claim 1.

References Cited in the file of this patent

Arbuzov et al.: Chemical Abstracts, vol. 47, page 97 (1953).